United States Patent [19]

Hiraiwa

[11] 4,137,790
[45] Feb. 6, 1979

[54] GEAR SHIFTING DEVICE
[75] Inventor: Kazuyoshi Hiraiwa, Tokyo, Japan
[73] Assignee: Nissan Motor Company, Limited, Yokohama, Japan
[21] Appl. No.: 743,415
[22] Filed: Nov. 19, 1976
[30] Foreign Application Priority Data
Nov. 22, 1975 [JP] Japan .................. 50-139756
[51] Int. Cl.² .......................... G05G 9/14; G05G 5/02
[52] U.S. Cl. ...................................... 74/473 R; 74/476
[58] Field of Search .............................. 74/473 R, 476

[56] References Cited
U.S. PATENT DOCUMENTS
2,073,045 3/1937 Bachman .......................... 74/476 X FOREIGN PATENT DOCUMENTS
1130300 5/1958 Fed. Rep. of Germany.
1217218 5/1966 Fed. Rep. of Germany.
2115468 3/1971 Fed. Rep. of Germany.
2128172 1/1973 Fed. Rep. of Germany ........ 74/473 R
1103586 5/1955 France.
70525 12/1958 France.
1537474 7/1968 France.
751899 7/1956 United Kingdom ................. 74/473 R Primary Examiner—Allan D. Herrmann
Attorney, Agent, or Firm—Richard L. Schwaab

[57] ABSTRACT

A shifting rod is provided intergrally with a block formed thereon with two projections spaced apart from each other laterally of the shifting rod to provide a space between the projections so that it is necessary to move a gear change lever in two directions intersecting each other for axially moving the shifting rod from one of its opposite shifting positions into the other shifting position.

6 Claims, 15 Drawing Figures

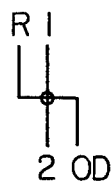
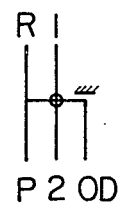
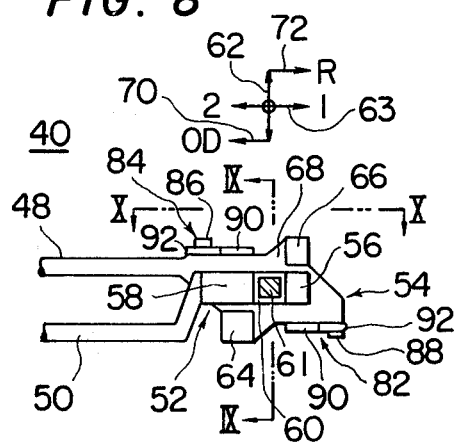
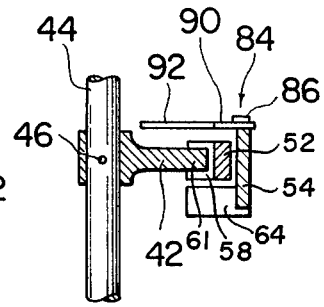
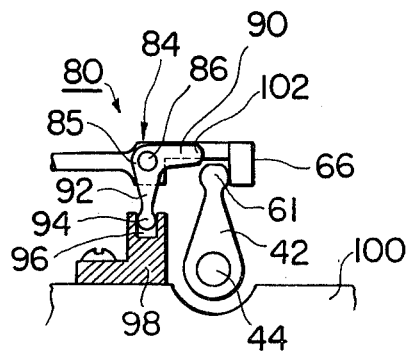
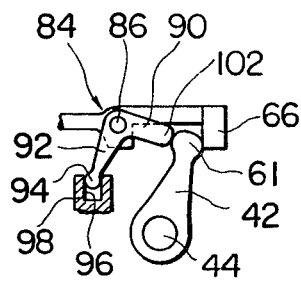

GEAR SHIFTING DEVICE

BACKGROUND OF THE INVENTION

The present invention relates generally to a gear shifting device for a manually controlled transmission of a vehicle and particularly to a gear shifting device of this type which is improved to comprise a shifting rod which requires to shift a gear change lever in two directions intersecting each other for moving the shifting rod from one of its two opposite shifting positions into the other shifting position.

As is well known in the art, a manually controlled transmission providing, for example, three forward speeds and one reverse speed is usually controlled by a gear change lever having a shift pattern in which a group of reverse and first speed gear (R and 1) positions and a group of second and third speed gear (2 and 3) positions are arranged respectively in two straight lines and the gear change lever is movable between two positions in each of the lines.

A manually controlled transmission providing an overdrive gear in lieu of the third speed gear has been controlled by a gear change lever having a shift pattern in which a group of the 1 and 2 positions and a group of the R position and overdrive gear (OD) position are arranged respectively in two straight lines and the gear change lever is movable between two positions in each of the lines. Thus, when a vehicle having such a transmission is travelling at a high speed in the overdrive gear, since if the change lever is erroneously shifted from the OD position, it can be easily shifted into the R position in a straight line, there has been a crisis that an accident takes place due to a damage of the transmission, an unstable movement of the vehicle caused by an abrupt deceleration, or the like.

SUMMARY OF THE INVENTION

It is, therefore, an object of the invention to provide a gear shifting device controlled by a gear change lever having a shift pattern in which at least one group of two shifting positions of the change lever are so arranged that it is necessary to move the change lever in two directions intersecting each other for shifting the change lever from one of the shifting positions into the other shifting position and that it is unnecessary to vary the construction of an existing transmission.

This and other objects and advantages of the invention will become more apparent from the following detailed description taken in connection with the accompanying drawings in which:

BRIEF DESCRIPTION OF THE DRAWINGS

FIG. 7 is a diagram of a first example of a shift pattern according to the invention for a gear change lever;

FIGS. 8 to 11 are schematic views of a first preferred embodiment of a gear shifting device according to the invention;

FIG. 12 is a diagram of a second example of a shift pattern according to the invention for a gear change lever having a parking lock position.

DETAILED DESCRIPTION OF PREFERRED EMBODIMENTS

Figure 1:
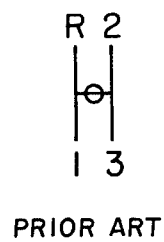
FIGS. 1 and 2 are diagrams of two examples of conventional shift patterns of gear change levers.

Referring to FIG. 1 of the drawings, there is shown a conventional shift pattern as per the introduction of the present specification for a gear change lever having 1, 2, 3 and R positions.

Figure 2:
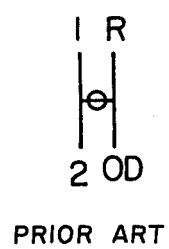

Referring to FIG. 2 of the drawings, there is shown a conventional shift pattern as per the introduction of the present specification for a gear change lever having 1, 2, OD and R positions.

Figure 3:
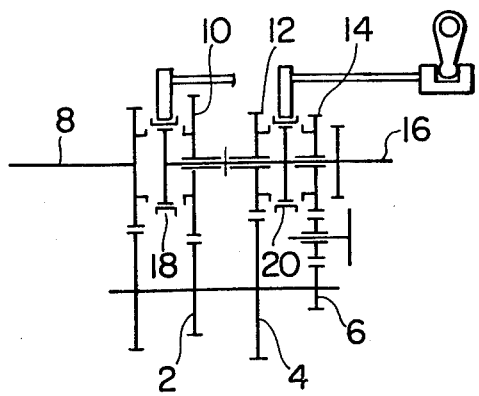
FIG. 3 is a schematic view of an example of a manually controlled transmission.

Referring to FIG. 3 of the drawings, there is shown a conventional manually controlled transmission providing first, second, overdrive and reverse gears. The transmission includes first, second and third countergears 2, 4 and 6 mounted integrally with each other and driven by an input shaft 8, first speed, overdrive and reverse gears 10, 12 and 14 meshing respectively with the first, second and third countergears 2, 4 and 6 at all times and freely rotatably mounted on an output shaft 16, a first clutch 18 for controlling connection between the output shaft 16 and on the one hand the input shaft 8 and on the other hand the first speed gear 10, and a second clutch 20 for controlling connection between the output shaft 16 and on the one hand the overdrive gear 12 and on the other hand the reverse gear 14. When the first clutch 18 is engaged with the input shaft 8 and the first speed gear 10, the second gear (direct drive) and the first gear are provided, respectively. When the second clutch 20 is engaged with the overdrive and reverse gears 12 and 14, the overdrive and reverse gears are provided, respectively.

Figure 4:
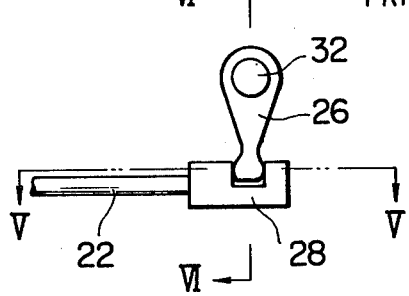
FIGS. 4 to 6 are schematic views of a conventional gear shifting device controlled by a gear change lever having the shift pattern shown in FIG. 2.
Figure 5:
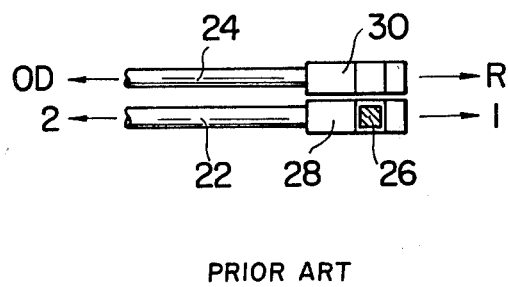
Figure 6:
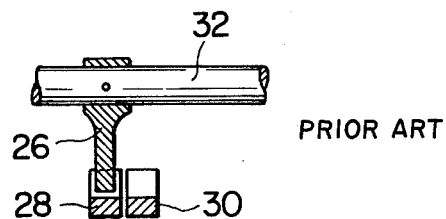

Referring to FIGS. 4 to 6 of the drawings, there is shown a conventional gear shifting device controlled by a change lever having the shift pattern shown in FIG. 2. The gear shifting device includes a first shifting rod 22 having 1 and 2 positions between which the rod 22 is axially movable and a second shifting rod 24 having OD and R positions between which the rod 24 is axially movable. The first and second shifting rods 22 and 24 are operatively connected respectively to the first and second clutches 18 and 20. Each of the shifting rods 22 and 24 can be easily shifted from one of the corresponding two shifting positions into the other shifting position by moving in a straight line a change lever (not shown) and a control lever 26 located in a groove of the corresponding block 28 or 30 of the each shifting rod 22 or 24 and operated by the change lever through a control shaft 32.

Referring to FIG. 7 of the drawings, there is shown an example of an improved shift pattern for a gear change lever having 1, 2, OD and R positions in which first, second, overdrive and reverse gears are obtained, respectively. The shift pattern shown in FIG. 7 prevents the change lever from being easily shifted from the OD position into the R position by manipulating the change lever in one direction and requires to manipulate the change lever in two directions intersecting each other for shifting the change lever from the OD position into the R position so that the change lever is prevented from being erroneously shifted into the R position when the vehicle is travelling with the change lever in the OD position.

Referring to FIGS. 8 to 11 of the drawings, there is shown a preferred embodiment of a gear shifting device according to the invention which can be operated by a gear change lever having the shift pattern shown in FIG. 7, without varying the construction of an existing transmission such as the transmission shown in FIG. 3. The gear shifting device, generally designated by the reference numeral 40, comprises a control lever 42 fixedly mounted on a control shaft 44 by suitable fastening means such as, for example, a pin 46. The control shaft 44 is movable or slidable axially and rotatable about its axis by manipulating a gear change lever (not shown) located in an operator's compartment of a vehicle (not shown) equipped with the gear shifting device 40 so that the control lever 42 is movable or slidable axially of the control shaft 44 and rotatable about the axis of the control shaft 44. The gear shifting device 40 further comprises first and second shifting rods 48 and 50 which may be operatively connected respectively to the first and second clutches 20 and 18 of the transmission shown in FIG. 3 and are arranged axially movably or slidably relative to each other by the rotation of the control lever 42. The first shifting rod 50 is movable in response to manipulation of the change lever from the N position into the 1 and 2 positions, while the second shifting rod 48 is movable in response to manipulation of the change lever from the N position into the OD and R positions. The shifting rod 50 is provided integrally with an end block 52 through which the shifting rod 50 is axially moved by the control lever 42 from a neutral position shown in FIG. 8 into 1 and 2 positions which correspond respectively to the 1 and 2 positions of the change lever. The shifting rod 48 is provided integrally with an end block 54 through which the shifting rod 48 is axially moved by the control lever 42 from a neutral position shown in FIG. 8 into OD and R positions which correspond respectively to the OD and R positions of the change lever. The block 52 is formed thereon with two opposite projections or shoulders 56 and 58 having therebetween a groove 60 of a suitable width into which an end portion 61 of the control lever 42 is movable and from which the end 61 of the control lever 42 is movable away when the control lever 42 is moved axially of the control shaft 44 or in the directions of the arrows 62 shown in FIG. 8. The end 61 of the control lever 42, when the control lever 42 is rotated by the control shaft 44 in the directions of the arrows 63 shown in FIG. 8 with the end 61 of the control lever 42 located in the groove 60, engages the projections 56 and 58 to axially move the shifting rod 58 into the 1 and 2 positions, respectively. The block 54 is formed thereon with first and second offset projections 64 and 66 spaced apart from each other laterally of the shifting rod 48 so as to provide a clearance or space or passage (no numeral) of a suitable width between the projections 64 and 66 in which passage the block 52 of the shifting rod 50 is located movably relative to the shifting rod 48 axially of the shifting rod 50. The projections 64 and 66 are also spaced apart from each other axially of the shifting rod 48 so as to provide a clearance or space or passage 68 of, for example, the same width as that of the groove 60 of the block 52 between the projections 64 and 66. The space 68 extends perpendicularly to the longitudinal direction of the shifting rod 48. The space 68 overlaps or is merged into or aligned with the groove 60 of the block 52 as shown in FIG. 8 when the shifting rods 48 and 50 are in their neutral positions. The end 61 of the control lever 42 is movable through the groove 60 of the block 52 when the end 61 is located in the space 68 and the control lever 42 is moved in the directions of the arrows 62. The end 61 of the control lever 42, when the control lever 42 is rotated in the directions of the arrows 70 and 72 shown in FIG. 8 with the end 61 of the control lever 42 confronting the projections 64 and 66 in the passage 68, engages the projections 64 and 66 to axially move the shifting rod 48 into the OD and R positions, respectively.

The shifting rod 48 is provided with engaging means 80 through which the shifting rod 48 is returned by the control lever 42 from the OD and R positions into the neutral position. The engaging means 80 comprises first and second bell crank or L-shaped levers 82 and 84 secured at thier corners 85 respectively to the block 54 of the shifting rod 48 rotatably about the axes of pins 86 and 88 so that the passage 68 for the end 61 of the control lever 42 is located between the projection 64 and the lever 82 and between the projection 66 and the lever 84. Each of the first and second levers 82 and 84 has a first arm 90 extending from the corresponding corner 85 toward the corresponding projection 64 or 66, and a second arm 92 extending from the corresponding corner 85 perpendicularly to the shifting rod 48 and the first arm 90 and in parallel with the control lever 42. Each of the second arms 92 has a rounded end 94 freely rotatably received and fitted in a groove 96 formed in a retainer 98 fixedly secured to a transmission case 100 and located on a side of the shifting rod 48 on which side the control lever 42 is arranged so that, when the shifting rod 48 is axially moved by the control lever 42 into the OD and R positions, the levers 82 and 84 are rotated about the axes of the pins 86 and 88 and free ends 102 of the first arms 90 approach and align with the end 61 of the control lever 42 with the ends 94 of the second arms 92 remaining received in the grooves 96 and rotated therein as shown in FIG. 11 and so that, when the control lever 42 is returned by the control shaft 44 into a neutral position shown in FIG. 10, the end 61 of the control lever 42 engages the ends 102 of the first arms 90 to return the shifting rod 48 into the neutral position and concurrently to return the levers 82 and 84 into neutral positions as shown in FIG. 10 with the ends 94 of the second arms 92 rotated in the grooves 96, respectively. The first arm 90 of each of the levers 82 and 84 is arranged deviating from or outside of the course of rotation of the end 61 of the conrol lever 42 which is rotated toward the levers 82 and 84 with the shifting rod 48 in the neutral position and the end 61 of the control lever 42 confronting the projections 64 and 66, respectively so that even if the control lever 42 is rotated toward the levers 82 and 84, the end 61 of the control lever 42 is prevented from engaging the ends 102 of the corresponding first arms 90 to prevent the shifting rod 48 from being axially moved by the control lever 42.

The gear shifting device 40 thus far described is operated as follows:

When the change lever is shifted from the N position of the shift pattern shown in FIG. 7 into the 1 and 2 positions, the control lever 42 is rotated from the neutral position shown in FIG. 8 in the directions of the arrows 63 by the control shaft 44 so that the end 61 of the control lever 42 engages the projections 56 and 58 of the block 52 to axially move the shifting rod 50 into the 1 and 2 positions, respectively. Accordingly, the first clutch 18 is engaged by the shifting rod 50 with the gear 10 and the input shaft 8 to provide the first and second gears, respectively.

When the change lever is shifted from the N position into the R position, the control lever 42 is first moved by the control shaft 44 from the N position into a position in which the end 61 of the control lever 42 confronts the projection 66, and the control lever 42 is then rotated in the direction of the arrow 72. By this operation, the end 61 of the control lever 42 engages the projection 66 to move it rightwards in the drawing so that the shifting rod 48 is axially moved into the R position to obtain the reverse gear. In the R position of the shifting rod 48, the bell crank lever 84 is rotated into a position shown in FIG. 11 in which the end 102 of the arm 90 of the lever 84 confronts the end 61 of the control lever 42.

When the change lever is returned from the R position into the N position, the control lever 42 is rotated in the reverse direction to the arrow 72 to engage the end 61 of the control lever 42 with the end 102 of the arm 90 of the lever 84 to axially force the shifting rod 48 into the N position through the lever 84. Even if the change lever is further manipulated beyond the N position in the reverse direction to the arrow 72, the shifting rod 48 is prevented from being axially moved and the control lever 42 only is rotated since when the lever 84 is in the neutral position shown in FIG. 10, the arm 90 of the lever 84 is located diverging from the course of rotation of the end 61 of the control lever 42 which is rotated in the opposite direction of the arrow 72.

When the change lever is shifted from the N position into the OD position, the control lever 42 is first moved from the N position into a position in which the end 61 of the control lever 42 confronts the projection 64, and then the control lever 42 is rotated in the direction of the arrow 70. By this operation, the end 61 of the control lever 42 engages the projection 64 to move it leftwards in the drawing so that the shifting rod 48 is axially moved into the OD position to provide the overdrive gear. Concurrently, the bell crank lever 82 is rotated into a position in which the end 102 of the arm 90 of the lever 82 confronts the end 61 of the control lever 42.

When the change lever is returned from the OD position into the N position, the control lever 42 is rotated in the opposite direction of the arrow 70 so that the end 61 of the control lever 42 is engaged with the end 102 of the arm 90 of the lever 82 to axially move the shifting rod 48 into the N position through the lever 82. Even if the change lever is further shifted beyond the N position in the contrary direction to the arrow 70, the control lever 42 only is rotated and the shifting rod 48 is prevented from being axially moved.

Referring to FIG. 12 of the drawings, there is shown an example of a shift pattern for a gear change lever having 1, 2, OD and R positions and a parking position in which an output shaft of an engine is locked by a parking device. The shift pattern shown in FIG. 12 is characterized in that a parking position P is added to the shift pattern shown in FIG. 7. In this instance, the P position is so located that the change lever is interposed between the R and P positions in a straight line in which the R position and the change lever lie.

Figure 13:
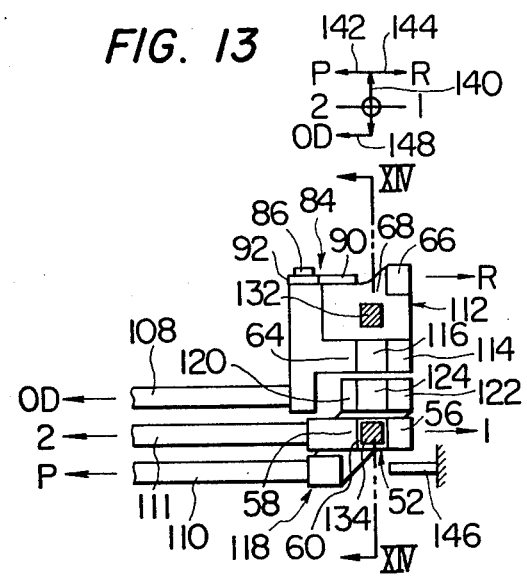
FIGS. 13 to 15 are schematic views of a second preferred embodiment of a gear shifting device according to the invention.
Figure 14:
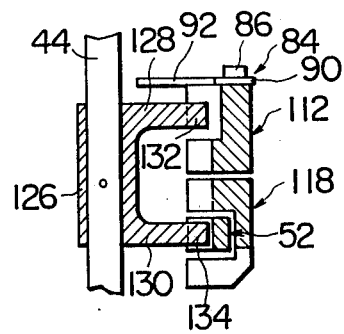
Figure 15:
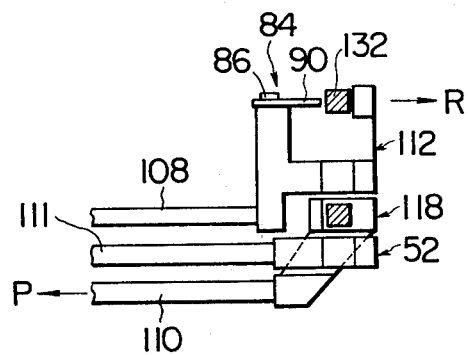

Referring to FIGS. 13 to 15 of the drawings, there is shown a preferred embodiment of a gear shifting device according to the invention which can be operated by a gear change lever having the shift pattern shown in FIG. 12, without varying the construction of an existing transmission such as the transmission shown in FIG. 2. In FIGS. 13 to 15, like component elements are designated by the same reference numerals as those used in FIGS. 8 to 11. The gear shifting device, generally designated by the reference numeral 106, is characterized in that it comprises a shifting rod 108 having OD and R positions, a shifting rod 110 having P position, and a shifting rod 111 similar to the shifting rod 50 shown in FIG. 8. The shifting rod 108 is characterized in that it is provided integrally with a block 112 having a projection 114 in lieu of the bell crank lever 82 of the shifting rod 48 shown in FIG. 8. The projection 114 confronts the projection 64 axially of the shifting rod 108 and is spaced apart from the projection 64 a suitable distance or width to form between the projections 64 and 114 a groove 116 similar to the groove 60 of the block 52 of the shifting rod 50. The shifting rod 110 is similar to the shifting rod 50 in that it is provided integrally with a block 118 having two opposite projections 120 and 122 which are similar to the projections 56 and 58 of the block 52 of the shifting rod 50 and are formed therebetween with a groove 124 similar to the groove 60 of the shifting rod 50. In the gear shifting device 106, the block 52 of the shifting rod 111 is arranged outside of the block 112 of the shifting rod 108, unlike the block 52 of the shifting rod 50 shown in FIG. 8 which is arranged between the projections 64 and 66. The projections 120 and 122 of the block 118 of the shifting rod 110 are arranged between the blocks 52 and 112 of the shifting rods 108 and 111, respectively. The blocks 52 and 118 of the shifting rods 111 and 110 intersect each other so that the shifting rod 111 is arranged between the shifting rods 108 and 110. The blocks 112, 118 and 52 of the shifting rods 108, 110 and 111 are arranged with respect to each other so that the passage 68 and the grooves 116, 124 and 60 are aligned with each other as shown in FIG. 13 when the shifting rods 108, 110 and 111 are in their neutral positions shown in FIG. 13.

The gear shifting device 106 comprises a bifurcate control lever 126 having two forked lever arms 128 and 130 having two end portions 132 and 134, respectively which form a line laterally of the shifting rods 108, 110 and 111 and are moved in the passage 68 and the grooves 116, 124 and 60. When the end 132 of the control lever 126 is located between and diagonally with respect to the projections 64 and 66 of the block 112, the end 134 of the control lever 126 is located in the groove 60 of the block 52, as shown in FIG. 13.

The gear shifting device 106 thus for described is operated as follows:

When the change lever is shifted from the N position into the P position, the control lever 126 is first moved axially of the control shaft 44 therewith in the direction of the arrow 140 shown in FIG. 13 into a position in which the end 132 of the control lever 126 confronts the projection 66 and the end 134 of control lever 126 is located in the groove 124, as shown in FIG. 15 and the control lever 126 is then rotated in the direction of the arrow 142 shown in FIG. 13. By this operation, although the end 132 of the control lever 126 is rotated toward the lever 84, the lever 84 is prevented from being engaged by the end 132 of the control lever 126 as described hereinbefore so that the block 112 and the shifting rod 108 is maintained at a standstill, while the end 134 of the control lever 126 engages the projection 120 to move it leftwards in the drawing. As a result, the shifting rod 110 is axially moved into the P position to obtain the parking lock.

When the change lever is shifted from the N position into the R position, the control lever 126 is rotated in the direction of the arrow 144 shown in FIG. 13 from the position shown in FIG. 15. By this operation, the end 132 of the control lever 126 engages the projection 66 to move it rightwards in the drawing so that the shifting rod 108 is axially moved into the R position to provide the reverse gear.

The shifting rod 108 is shifted into the OD position by moving the end 132 of the control lever 126 into the groove 116 and engaging the end 132 with the projection 64. The shifting rod 111 is shifted into the 1 and 2 positions by moving the end 134 of the control rod 126 located in the groove 60 as shown in FIG. 13 in opposite directions.

A stop 146 is provided for, when the shifting rod 108 is returned from the OD position into the neutral position shown in FIG. 13 by engaging the end 132 of the control lever 126 with the projection 114, preventing the shifting rod 108 from being moved beyond the neutral position in the reverse direction of the arrow 148 shown in FIG. 13.

The first, second, overdrive and reverse gears and the parking lock are obtained only when the shifting rods 111, 108 and 110 are moved into the corresponding 1, 2, OD, R and P positions throughout the gear shifting devices 40 and 106.

Although the invention has been described such that each of the shifting rods 48 and 108 has the OD and R positions and the shifting rod 110 has the P position as an example, each of the shifting rods 48, 108 and 110 can have other shifting positions.

It will be appreciated that the invention provides a gear shifting device comprising a shifting rod provided integrally with a block formed thereon with two projections which are spaced apart from each other laterally of the shifting rod to provide between the projections a space which renders it necessary to move a gear change lever in two directions intersecting each other for axially moving the shifting rod from one of its opposite shifting positions into the other shifting positions so that it is rendered impossible to move the shifting rod from the one shifting position into the other shifting position by moving the change lever in a straight line only and so that the vehicle is prevented from erroneously being placed into a dangerous condition.

It is also appreciated that the invention provides a gear shifting device comprising a shifting rod which renders it necessary to move the gear changes lever in two directions intersecting each other for moving the shifting rod between its opposite shifting positions and which can be connected to an existing transmission without varying the construction of the transmission.

What is claimed is:

1. A gear shifting device for a transmission of a vehicle, comprising a first shifting rod having a neutral position and first and second shifting positions between which said first shifting rod is axially movable, said first shifting rod having a first block integral therewith, said block being formed thereon with first and second projections which are spaced apart from each other axially of said first shifting rod and are spaced apart from each other laterally of said first shifting rod and between which a space is formed which extends perpendicularly to the longitudinal direction of the first shifting rod, and operating means for operating said first shifting rod, said operating means having a first end portion which is located in said space movably axially of said first shifting rod and perpendicularly to the longitudinal direction of said first shifting rod and which is engageable with said first and second projections, said end portion having in said space first and second neutral positions in which said end portion faces said first and second projections, respectively, and when moved in opposite directions axially of said first shifting rod, engages said first and second projections to move said first shifting rod into said first and second shifting positions, respectively, said block having engaging means which said end portion engages to return said first shifting rod from said first and second shifting positions into said neutral position.

2. A gear shifting device as claimed in claim 1, further comprising a second shifting rod arranged axially movably relative to said first shifting rod and having a neutral position and a third shifting position between which said second shifting rod is axially movable, said second shifting rod being provided integrally with a second block located in parallel with said first block, said second block being formed with a groove which is aligned with said space when said first and second shifting rods are in said neutral positions, said operating means having a second end portion movable axially of said shifting rod and perpendicularly to the longitudinal direction of said second shifting rod, said second end portion being located in said groove when said first end portion is in said second neutral position and engaging a shoulder of said groove to move said second shifting rod into said third shifting position when said second end portion is located in said groove and said first end portion is moved away from said second projection axially of said first shifting rod.

3. A gear shifting device as claimed in claim 2, further comprising a third shifting rod arranged axially movably relative to said first and second shifting rods and having a neutral position and fourth and fifth shifting positions between which said third shifting rod is axially movable, said third shifting rod being provided integrally with a third block located in parallel with said second block, said third block being formed with a groove which is aligned with said groove of said second block when said second and third shifting rods are in said neutral positions, said second end portion being located in said groove of said third block when said first end portion is located between said first and second projections of said first block and engaging first and second opposite shoulders of said groove of said third block to move said third shifting rod into said fourth and fifth shifting positions when said second end portion is located in said groove of said third block and is moved toward said first and second shoulders, respectively.

4. A gear shifting device for a transmission of a vehicle, comprising a first shifting rod having a neutral position and first and second shifting positions between which said first shifting rod is axially movable, said first shifting rod having a first block integral therewith, said block being formed thereon with first and second projections which are spaced apart from each other axially of said first shifting rod to provide a space between said projections and are spaced apart from each other laterally of said first shifting rod, and a first control lever mounted movably axially of said first shifting rod and located in said space movably laterally of said first shifting rod, said control lever having in said space first and second neutral positions in which said control lever, when moved in opposite directions, engages said first and second projections to move said first shifting rod into said first and second shifting positions, respectively, said block having engaging means which said control lever engages to return said first shifting rod from said first and second shifting positions into said neutral position, said engaging means comprising first and second bell crank levers both rotatably mounted at their corners on said block at first and second positions in which said space is between said first projection and said first bell crank lever and between said second projection and said second bell crank lever, respectively, each of said bell crank levers comprising a first arm which extends toward the corresponding projection and is located outside of the course of movement of said control lever which is moved toward each bell crank lever and a second arm having an end rotatably received in a retainer which is located stationary relative to said first shifting rod and on a side of said first shifting rod on which side said control lever is arranged, said each bell crank lever being so sized and arranged that it is, when said first shifting rod is moved into the corresponding shifting position, rotated into a position in which a free end of said first arm confronts said control lever and is engaged by said control lever returned into the corresponding neutral position.

5. A gear shifting device for a transmission of a vehicle, comprising a first shifting rod having a neutral position and first and second shifting positions between which said first shifting rod is axially movable, said first shifting rod having a first block integral therewith, said block being formed thereon with first and second projections which are spaced apart from each other axially of said first shifting rod to provide a space between said projections and are spaced apart from each other laterally of said first shifting rod;

a first control lever mounted movably axially of said first shifting rod and located in said spaced movably laterally of said first shifting rod, said control lever having in said space first and second neutral positions in which said control lever, when moved in opposite directions, engages said first and second projections to move said first shifting rod into said first and second shifting positions, respectively, said block having engaging means which said control lever engages to return said first shifting rod from said first and second shifting positions into said neutral position; and a second shifting rod arranged axially movable relative to said first shifting rod and having a neutral position and third and fourth shifting positions between which said second shifting rod is axially movable, said shifting rod being provided integrally with a second block located between said first and second projections said second block being formed with a groove which is merged into said space, when said first and second shifting rods are in said neutral positions, to allow said control lever to be located in said groove, said groove having first and second opposite shoulders which said control lever engages to move said second shifting rod into said third and fourth shifting positions when said control lever is located in said groove and is moved toward said first and second shoulders, respectively.

6. A gear shifting device for a transmission of a vehicle, comprising a first shifting rod having a neutral position and first and second shifting positions between which said first shifting rod is axially movable, said first shifting rod having a first block integral therewith, said block being formed thereon with first and second projections which are spaced apart from each other axially of said first shifting rod to provide a space between said projections and are spaced apart from each other laterally of said first shifting rod;

a first control lever mounted movably axially of said first shifting rod and located in said space movably laterally of said first shifting rod, said control lever having in said space first and second neutral positions in which said control lever, when moved in opposite directions, engages said first and second projections to move said first shifting rod into said first and second shifting positions, respectively, said block having engaging means which said control lever engages to return said first shifting rod from said first and second shifting positions into said neutral position;

a second shifting rod arranged axially movably relative to said first shifting rod and having a neutral position and a third shifting positon between which said second shifting rod is axially movable, said second shifting rod being provided integrally with a second block located in parallel with said first block, said second block being formed with a groove which is aligned with said space when said first and second shifting rods are in said neutral positions; and a second control lever fixedly connected to said first control lever, said second control lever being located in said groove when said first control lever is in said second neutral position and engaging a shoulder of said groove to move said second shifting rod into said third shifting position when said second control lever is located in said groove and said first control lever is moved away from said second projection axially of said first shifting rod, wherein said engaging means comprises a bell crank lever rotatably mounted at its corner on said first block at a position in which said space is between said second projection and said bell crank lever, said bell crank lever comprising a first arm which extends toward said second projection and is located outside of the course of movement of said first control lever moved toward said bell crank lever and a second arm having an end rotatably received in a retainer which is located stationarily relative to said first shifting rod and on a side of said first shifting rod on which side said first control lever is arranged, said bell crank lever being so sized and arranged that it is, when said first shifting rod is moved into said second shifting position, rotated into a position in which a free end of said first arm confronts said first control lever and is engaged by said first control lever returned into said second neutral position, and a third projection formed on said first block at a position in which said space is between said first and third projections, said third projection being so located that said first control lever engages said third projection to return said first shifting rod into said neutral position when said first shifting rod is in said first shifting position and said first control lever is returned into said first neutral position.

* * * * *